United States Patent [19]

Doskocil

[11] Patent Number: 4,703,786
[45] Date of Patent: Nov. 3, 1987

[54] STUMP GRINDING APPARATUS

[76] Inventor: David L. Doskocil, 701 W. Olive St., Redlands, Calif. 92373

[21] Appl. No.: 835,563

[22] Filed: Mar. 3, 1986

[51] Int. Cl.⁴ ............................................. A016 23/06
[52] U.S. Cl. .................................... 144/2 N; 37/2 R; 56/17.2
[58] Field of Search ............... 144/2 N; 56/17.1, 17.2, 56/119; 37/2 R; 30/379, 379.5

[56] References Cited

U.S. PATENT DOCUMENTS 3,336,958 8/1967 Carlton ................................ 144/2 N
4,402,352 9/1983 Hodges ................................ 144/2 N Primary Examiner—W. D. Bray
Attorney, Agent, or Firm—Lyon & Lyon

[57] ABSTRACT

An improved stump grinding apparatus wherein the design and location of the components encourage the operator to stay at the handles which are located away from the cutting wheel while it is rotating. The cutting wheel rotates whenever the engine is running, and, because the apparatus is supported by a pair of tires and its weight is balanced slightly forward of the tires (the end with the cutting wheel), the rotating cutting wheel will fall to the ground whenever the operator lets go of the handles. Further, because the underside of the cutting wheel is exposed at all times, if the operator releases the handles without first stopping the engine, the cutting wheel will dig into the ground. The apparatus also has an angular side chute aft of the cutting wheel which deflects wood chips from the stump being ground to the side of the apparatus.

10 Claims, 4 Drawing Figures

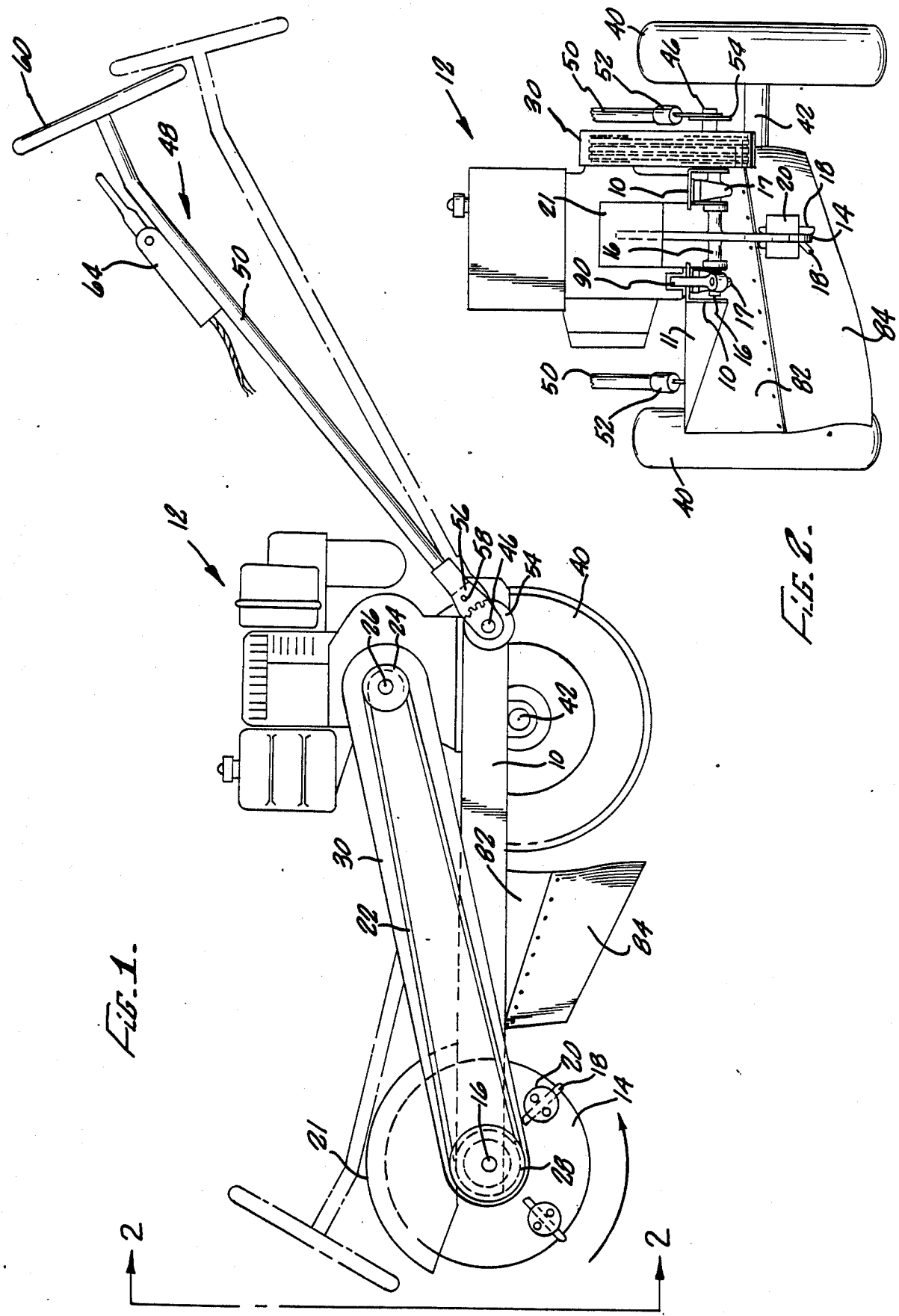

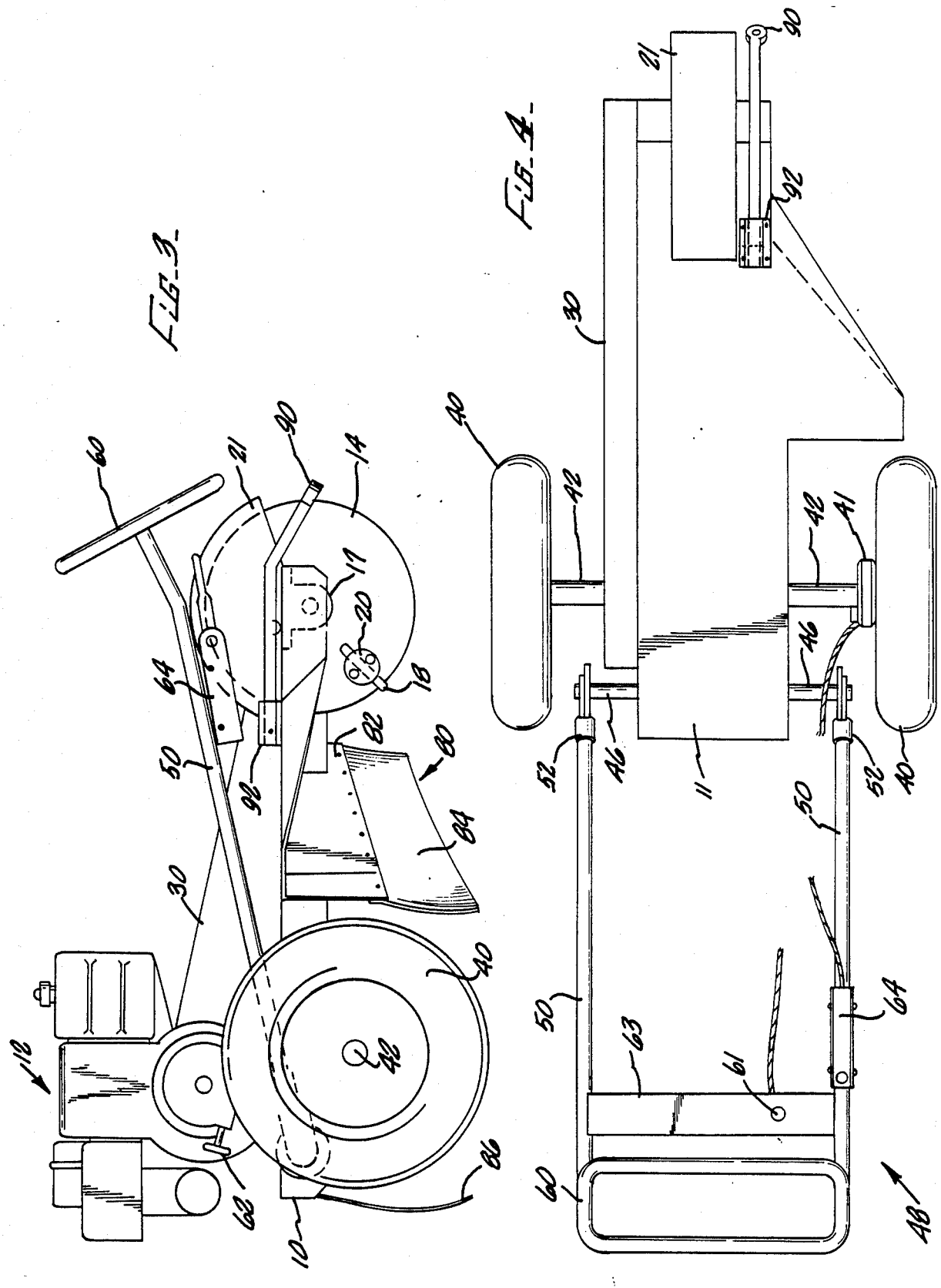

STUMP GRINDING APPARATUS

BACKGROUND

This invention relates to a mechanical device for grinding down tree stumps and the like.

One of the most perplexing tasks associated with land clearing is what to do with the tree stumps. Falling the trees is relatively simple. After the trees have been cut and removed, however, the tree stumps remain, and must be removed if the land is to be rendered useful for construction or cultivation, etc. In the past, stumps have been dug out, cut out, pulled out, and blasted out with explosives. These methods have proven difficult, time consuming, expensive or all three. This led to development of devices which could grind the stump to a level below the surface of the surrounding soil. These devices, of which Shivers, Jr. et al., U.S. Pat. No. 4,074,447 is representative, utilize a rotating cutting wheel, typically driven by a combustion engine. These prior art devices, however, have been subject to misuse by the operator, which can result in severe injuries. Although intended and designed for safe operation, the prior art devices could be misused by the operator in such a way that the operator would venture into the vicinity of the cutting wheel while it was rotating.

Therefore, there exists a need in the art for an improved stump grinding apparatus such that it is less susceptible to operator misuse.

SUMMARY OF INVENTION

The apparatus herein described provides such an improved device wherein the operator is encouraged to remain at the controls of the apparatus (which are located at the furthest end distally from the cutting wheel) at all times when the cutting wheel is rotating. This result is accomplished by virtue of the design of the apparatus, which places the cutting wheel at one end of the chassis, and all controls on handle means which extend rearwardly from the other end of the chassis. The design further provides that the cutting wheel rotates whenever the engine is running, and the underside of the cutting wheel is exposed at all times. Lastly, the apparatus has a pair of support tires which are situated such that there is slightly more weight forward of the tires, so that when the handles are released by the operator, the exposed underside of the cutting wheel will hit the ground. Because the operator cannot let go of the handles without the cutting wheel hitting the ground, and because the cutting wheel rotates whenever the engine is running, the operator has no choice but to stop the engine before letting go of the handles.

To keep the cut material from accumulating underneath the apparatus, a deflector chute is attached angularly to the chassis and hangs downward between the cutting wheel and the tires, such that the cut material which is propelled backwards by the cutting wheel strikes the deflector chute and is thrown out to the sides.

This design also improves the maneuverability and handling of the apparatus.

Other advantages and objects of the present invention will become apparent from the accompanying detailed description, the drawings, and the claims.

DESCRIPTION OF THE FIGURES

FIG. 1 is an elevational view of a stump grinding apparatus in accordance with the present invention (the tire on the near side of the apparatus has been removed for viewing of the interior componentry) in which the control handles are in the extended operational position. The manner in which the handles can be brought to a fully forward position for towing or storage, or can be adjusted for different operating heights, is shown in shadow.

FIG. 2 is a partial front view showing the deflector chute positioned behind the cutting wheel.

FIG. 3 is another elevational view of the stump grinding apparatus taken from the side of the apparatus opposite that shown in FIG. 1, this time showing the handle in the fully forward position.

FIG. 4 is a top planar view of the chassis, handle, tires and cutting wheel of the stump cutting apparatus.

DESCRIPTION OF THE PREFERRED EMBODIMENT

Referring now to the drawings, the preferred embodiment of the stump grinding apparatus in accordance with the present invention is depicted.

The chassis of the apparatus comprises a rectangular frame 10 and a cover piece 11 upon which a conventional internal combustion engine, fuel tank, air filter, etc., generally denoted 12, are mounted near the rear portion thereof. A cutting wheel 14 is attached to an axle 16 which is journaled to the front portion of the frame 10 by means of brackets 17. Cutting wheel 14 is located at the approximate centerpoint of the width of frame 10. Cutting wheel 14 has a plurality of radially extending cutting teeth 18, which are circumferentially mounted on cutting wheel 14 by mounting clamps 20. The teeth 18 are preferably composed of steel with carbide tips. A guard 21 which is attached to frame 10 covers the upperside of cutting wheel 14, but leaves the underside exposed at all times.

The cutting wheel 14 is caused to rotate in a counter clockwise direction (as shown in FIG. 1) by means of direct drive belts 22 which runs between sprocket 24 which is attached to the drive shaft 26 of engine 12, and sprocket 28 which is attached to the cutting wheel 14. In the preferred embodiment, engines having 10–16 horse power, producing power output of 2700–2800 rpms have proven reliable. Sprocket 24 is 3 inches in diameter and sprocket 28 is 4¾ inches in diameter, such that cutting wheel 14 is rotated at 1700–1750 rpms. A belt guard 30 (which has been broken away in FIG. 1 so as to depict the drive belt assembly) totally encases the drive belt 30 and sprockets 24 and 28.

Attached to the rear portion of chassis 10 are a pair of pneumatic tires 40. Each of the tires 40 is attached to a straight axle rod 42 which is journaled to the underside of frame 10. The placement of axle rod 42 on frame 10 is such that the weight of the apparatus fore and aft of the axle rod 42 is approximately equal, with slightly more weight in front of the wheels such that unaided on relatively level ground, the cutting wheel 14 will rest on the ground.

Attached to a transverse shaft 46 on the rear portion of frame 10 is a handle, generally designated 48. Handle 48 comprises a pair of handle shafts 50 which are rotatably attached at one end to transverse shaft 46 by means of brackets 52. Brackets 52 have a cylindrical aperture at one end which accepts and retains one end of the shaft 52. The other end of bracket 52 has an appropriately sized aperture which fits over and rotates upon the transverse shaft 46. The bracket 52, and hence handle 48, is locked into position on, and made adjustable relative to, transverse shaft 46 by means of a ratchet gear 54 which is fixedly attached to transverse shaft 46, and a pawl 56 which is attached to bracket 52 by means of bolt 58. By loosening bolt 58, the pawl 56 can be disengaged from ratchet gear 54, allowing the position of handle 48 to be adjusted. Further, the shafts 50 of handle 48 are sufficiently spaced apart such that when the pawl 56 is released from ratchet gear 54, the handle can be rotated fully forward as shown in FIG. 3 for transportation or storage. The device is not operable when the handle is in this position.

For ease of operator control, the handle 48 has a rectangular gripping bar 60 which is attached at the distal end of the shafts 50. The gripping bar 60 is attached at an angle to the shafts 50 such that it will be approximately perpendicular to the arms of the operator, thereby providing upper and lower grasping points for improved control.

The engine can be either electric or recoil start. Shown in the figures is a recoil-type engine. If an electric start engine is desired, a battery must be included. Space for the battery can be created by extending the frame 10 rearwardly slightly. In that event, the position of the tires on frame 10 must be changed to ensure proper balance. The engine shown in the figures is started by pulling the engine cord 62. Note that the engine 12 is oriented such that the operator must stand rearwardly of the apparatus to pull the cord 62. Because of the arrangement of the handle 48 and the tires 40, the easiest way to start the engine 12 is to stand behind the apparatus, pull the handle 48 down, thereby lifting the cutting wheel 14 off of the ground (this is easy to do because the apparatus is approximately balanced fore and aft of the tires 40), and grasp and pull the cord 62. Because the apparatus has no clutch between the engine 12 and the cutting wheel 14, the cutting wheel 14 rotates at all times when the engine 12 is running. Accordingly, this arrangements of components is important to ensure that the operator is standing behind the apparatus when starting the engine.

At first blush, it might appear that the lack of a clutch would be unsafe. Surprisingly, however, it has been discovered that omitting the clutch is actually safer. With a clutch, the operator is tempted to leave the engine running, disengage the clutch, and then work around the cutting wheel to remove debris, inspect progress, etc. There is a risk in this situation, however, that the operator may not have properly disengaged the clutch, or that the clutch may fail, such that the cutting wheel unexpectedly begins to rotate while the operator is within its vicinity. Therefore, although some stump grinding machines have included a clutch means, that is omitted in this invention. Similarly, some machines of earlier design included a shield for the cutting wheel. The shield, like that on a power circular saw, was weighted so that gravity would cause it to rotate down to encase the cutting wheel. In those machines having such a shield, the operator must pull the shield up to expose the cutting wheel. Again, surprisingly, it was discovered that this apparatus was subject to misuse as the operator might leave the cutting wheel 14 turning within the shield while working within its vicinity.

It has been found that by removing the clutch and the shield, the operator has no choice but to stop the engine anytime the operator wishes to let go of the handles such that the cutting wheel will then contact the ground.

All of the controls for operation of the apparatus are located on the handle 48, within grasp of the operator. Conversely, because the controls are all located thusly, the operator cannot venture away from the handle 48 during operation of the apparatus, meaning that the operator must at all times be a significant distance away from the cutting wheel 14.

A switch 61 for stopping the engine is attached to crosspiece 63 extending between shafts 50. If an electric start engine is used, the start switch would also be located on crosspiece 63. The controls also include a brake 41 on one of the tires 40. This is controlled by handle 64 which is attached to one of the shafts 50. Only one of the tires 40 is braked, because in operation, to grind a stump, the braked tire 40 becomes a pivot point about which the apparatus is rotated so that the cutting wheel can make a pass across the stump to be ground. Once that pass is completed, the brake is released, the apparatus moved slightly, the brake reset, and the cutting wheel again started, and another pass is made. This procedure continues until an entire layer of the stump is removed. The process is repeated until the stump has been ground down as far as desired.

To ensure that the chips of wood cut from the stump by cutting wheel 14 do not hit the operator, two protective devices are used. The first is a chute, generally designated 80, which is medially mounted to the underside of frame 10, aft of cutting wheel 14 and forward of tires 40. The chute 80 comprises a chute support 82 which is fixedly attached to the frame 10. Depending from chute support 82 is a flexible flap 84. This is best viewed in FIG. 3. The chute is at a rather sharp angle, so that chips of wood which are thrown rearwardly by the cutting wheel 14 will hit the chute and be deflected to the side of the apparatus. A second flexible flap 86 is attached to the rear of frame 10 and is sufficiently long to drag on the ground in normal operation, and is sufficiently wide to provide adequate protection for the operator. Rear flap 86 will stop any debris which eludes chute 80.

To transport the apparatus to the job site, a removable tow bar 90 is attached to the apparatus by means of a bracket 92 which is in turn fixedly attached to the cross piece 11 on the frame 10.

Although specific embodiments of the inventive concepts hereinafter claimed have been depicted in the figures and hereinabove described, it will be apparent to those skilled in the art that many modifications to those embodiments are possible without departing from the inventive concepts hereinafter claimed. Accordingly, this patent and the protection it provides are not limited to these few specific embodiments, but is of the full breath and scope of the appended claims.

What is claimed is:

1. A stump grinding apparatus comprising
   (a) a chassis having a forward end and a rearward end;
   (b) a cutting wheel mounted rotatably on and adjacent the forward end of said chassis;
   (c) a guard attached to said frame and substantially covering only the upperside of said cutting wheel such that the underside of said cutting wheel is exposed at all times;
   (d) engine means attached on said chassis adjacent the rearward end thereof for propelling said cutting wheel;
   (e) drive means for continuously linking said engine means to said cutting wheel such that said cutting wheel rotates whenever said engine means is running;

(f) a handle attached to said chassis and extending upwardly and rearwardly therefrom; and (g) a pair of tires attached to said chassis and positioned relative thereto such that the apparatus is approximately balanced fore and aft of said tires, there being slightly more weight forward of said tires.

2. The apparatus of claim 1 comprising a chute angularly mounted to the underside of said chassis between said cutting wheel and said tires for deflecting material cut by said cutting wheel to the side of the apparatus.

3. The apparatus of the claim 2 wherein said chute is made of flexible material.

4. The apparatus of claim 3 further comprising a catcher flap attached and depending downwardly from the rear of said chassis for catching cut material not deflected by said chute.

5. The apparatus of claim 1 wherein one of said tires is equipped with a brake.

6. The apparatus of claim 5 further comprising means for starting, stopping and regulating the rpm of said engine means, and for setting and releasing said brake, said means attached to said handle.

7. A stump grinding apparatus comprising:

a chassis;
a cutting wheel rotatably attached to said chassis;
engine means for driving said cutting wheel;
tires attached to said chassis for supporting said chassis;
handle means attached to said chassis for controlling said apparatus;
means for causing said cutting wheel to rotate whenever said engine is running; and
means for biasing said cutting wheel towards the ground if the operator of the apparatus lets go of said handle.

8. The invention of claim 7 wherein said means for causing said cutting wheel to rotate comprises clutchless direct drive between said engine means and said cutting wheel.

9. The invention of claim 7 wherein said means for biasing comprises said tires being attached to said chassis relative to said cutting wheel, said drive means, said engine and said handle, such that the apparatus is substantially balanced fore and aft of said tires, with slightly more weight forward of said tires.

10. The invention of claim 9 further comprising a guard attached to said frame and substantially covering only the upper side of said cutting wheel such that the underside of said cutting wheel is exposed at all times.

* * * * *